C. E. MAYNARD.
BEVELING AND SEALING CLAMP.
APPLICATION FILED JUNE 25, 1920. RENEWED MAR. 12, 1921.
1,391,784.  Patented Sept. 27, 1921.
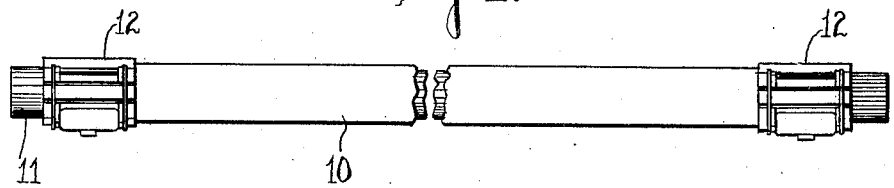
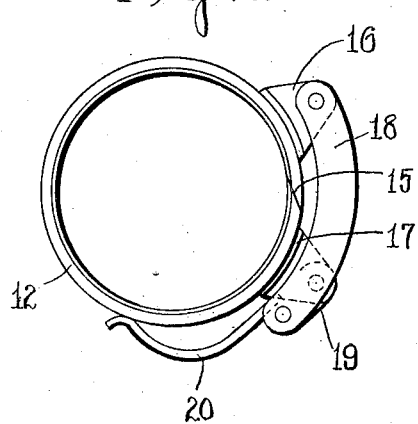
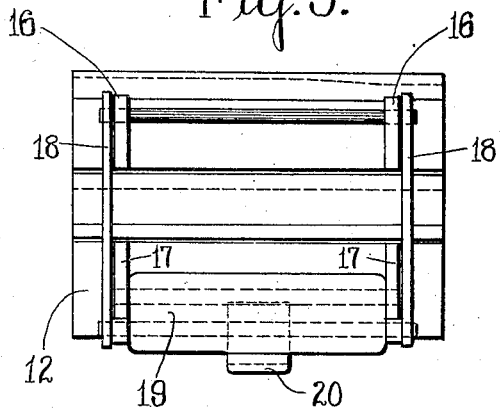
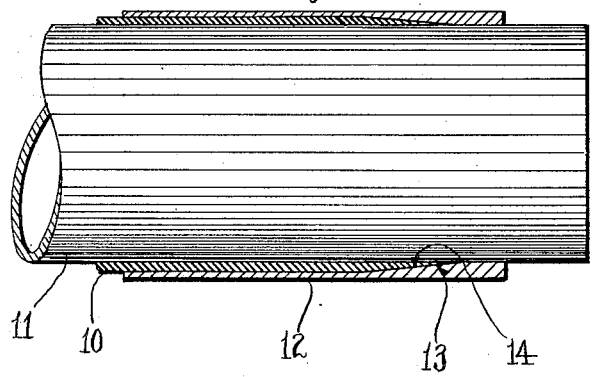
INVENTOR
Charles Edgar Maynard.
BY
ATTORNEY

UNITED STATES PATENT OFFICE.

CHARLES EDGAR MAYNARD, OF NORTHAMPTON, MASSACHUSETTS, ASSIGNOR TO THE FISK RUBBER COMPANY, OF CHICOPEE FALLS, MASSACHUSETTS, A CORPORATION OF MASSACHUSETTS.

BEVELING AND SEALING CLAMP.

1,391,784.        Specification of Letters Patent.        Patented Sept. 27, 1921.

Application filed June 25, 1920, Serial No. 391,689. Renewed March 12, 1921. Serial No. 451,841.

*To all whom it may concern:*

Be it known that I, CHARLES EDGAR MAYNARD, a citizen of the United States of America, residing at Northampton, in the county of Hampshire and State of Massachusetts, have invented certain new and useful Improvements in a Beveling and Sealing Clamp, of which the following is a specification.

My invention relates to a method and apparatus for skiving and vulcanizing rubber tubes. It has for its object the improvement of existing processes of manufacturing rubber tubes and in particular the skiving of the tube at the same time that the tube is being vulcanized.

My invention will now be described with particular reference to the accompanying drawings, in which—

Figure 1 is a view of a mandrel with the rubber tube mounted thereon showing my skiving clamps in position;

Fig 2 is an end view of one of the clamps;

Fig. 3 is a side view thereof; and

Fig. 4 is a view of a mandrel showing the end of the tube and the clamp in section.

In vulcanizing rubber tubes, particularly such as are used as inner tubes for automobile tires, it has been customary to vulcanize the tube upon a mandrel or pole and to bind the end of the tube to the mandrel with adhesive tape during vulcanization. The expense of the tape in this process was considerable and the end of the tube was very uneven, necessitating trimming the end of the tube and beveling or skiving it upon a suitable machine after vulcanization. By the use of my invention I both save the expense of the tape itself, which usually served for but one heat, and avoid the extra operations incident to the trimming and skiving of the tube after vulcanization.

For this purpose I mount a rubber tube 10 on a suitable mandrel 11 and clamp the ends of the tube against the mandrel with a suitable ring or sleeve 12 the inside of which has an annular beveled portion 13 of substantially frusto-conical form so shaped as to skive or bevel the end of the rubber tube as at 14 These rings are placed about the end of the tube as shown in Fig. 1 prior to vulcanization and preferably remain in place to clamp the tube to the mandrel during the vulcanizing operation. By this means the tube when vulcanized has an even end suitably skived which will serve without further beveling for producing the splice which is made between the two ends of the tube to prepare the tube for use as the inner tube of an automobile tire.

Preferably this clamping ring is constructed with a longitudinal scarf joint 15 which permits the ring to be expanded over the end of the rubber tube. In order to draw the ring firmly together about the tube suitable clamping means is provided. In the embodiment shown supports 16 and 17 are secured to the ring on opposite sides of the joint 15. Pivoted to supports 16 are curved links 18 pivoted at their either ends to a short link 19 pivotally mounted on supports 17. Link 19 is provided with a handle 20 by which the above mechanism can be operated. It will be clear from Fig. 2 that the linkage described produces a toggle action which will be self locking so that when handle 20 has been swung to the position in this figure the clamp will remain closed until released by the operator.

I claim:

1. The method of producing rubber tubes comprising locating the tube on a mandrel, compressing the ends of the tube against the mandrel by a smooth surface which is tapered toward the mandrel so as to skive the end of the tube, and vulcanizing the tube while so compressed.

2. The method of producing rubber tubes comprising locating the tube upon a mandrel, compressing the ends of the tube by a smooth surface which is tapered so as to skive the end of the tube, and vulcanizing the tube while so compressed.

3. A device of the class described comprising a clamping ring presenting an interiorly beveled surface adapted to press a tube against a mandrel and skive the ends of the tube, and means to contract the ring.

4. A device of the class described, comprising a clamping ring presenting an interiorly beveled surface adapted to press a tube against a mandrel and skive the ends of the tube, said ring being split longitudinally, and a clamp constructed and arranged to contract the ring and hold it in its contracted position.

5. In combination with a cylindrical mandrel, a removable flexible sleeve formed with a longitudinally divided frusto-conical portion adapted to embrace the end of a rubber tube upon said mandrel.

6. A device of the class described adapted to press against a cylindrical mandrel a rubber tube mounted thereon, comprising a longitudinally split sleeve provided interiorly with an annular beveled portion, said sleeve being contractible to press the tube against the mandrel and expansible so that it may be removed from the tube. the longitudinal split in the sleeve being constructed so as to present a substantially smooth interior surface during the contraction of the sleeve.

CHARLES EDGAR MAYNARD.